C. BACKER.
ELECTRIC MOTOR.
APPLICATION FILED APR. 6, 1910.
979,637.
Patented Dec. 27, 1910.
2 SHEETS—SHEET 1.
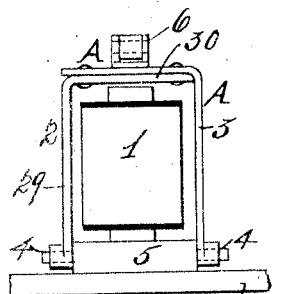
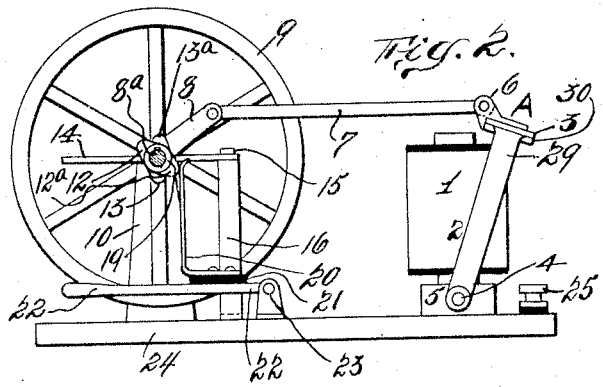
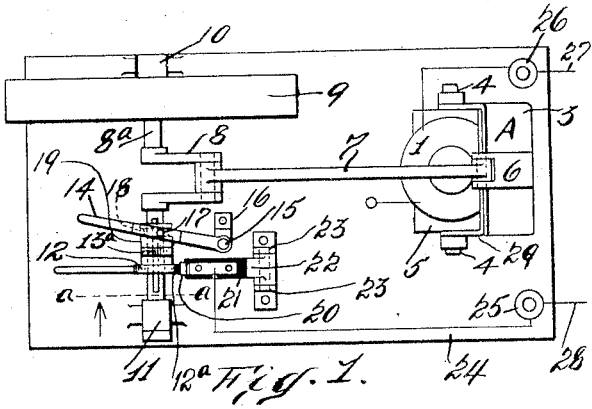
Witnesses:
Inventor:
Charles Backer

C. BACKER.
ELECTRIC MOTOR.
APPLICATION FILED APR. 6, 1910.

979,637.

Patented Dec. 27, 1910.
2 SHEETS—SHEET 2.

Witnesses:
C. A. Jams
Estelle O. Hamburger

Inventor:
Charles Backer
by Maurice Block
Attorney.

UNITED STATES PATENT OFFICE.

CHARLES BACKER, OF NEW YORK, N. Y., ASSIGNOR OF FORTY-NINE ONE-HUNDREDTHS TO RUDOLPH ROSENFELD, OF NEW YORK, N. Y.

ELECTRIC MOTOR.

979,637.

Specification of Letters Patent. Patented Dec. 27, 1910.

Application filed April 6, 1910. Serial No. 553,680.

*To all whom it may concern:*

Be it known that I, CHARLES BACKER, a citizen of the United States, residing in the borough of Bronx, city, county, and State of New York, have invented certain new and useful Improvements in Electric Motors, of which the following is a clear, full, and exact description.

This invention relates to an improvement in electric motors, the object being to provide an electric motor of such construction as to obviate to a large extent any friction that would oppose its operation.

To accomplish the above-named result, I have constructed a motor a part of which consists of an oscillatory armature, the said armature being connected to a crank carried by a suitable shaft. When the armature is oscillated by the pull of an adjacent magnet the shaft will be rotated. In connection with the said shaft, armature and adjacent magnet, I employ specially constructed circuit closers which are adapted to make and break the circuit, for the magnet, at intervals, the said intervals being timed with respect to the oscillation of the armature.

Figure 4:
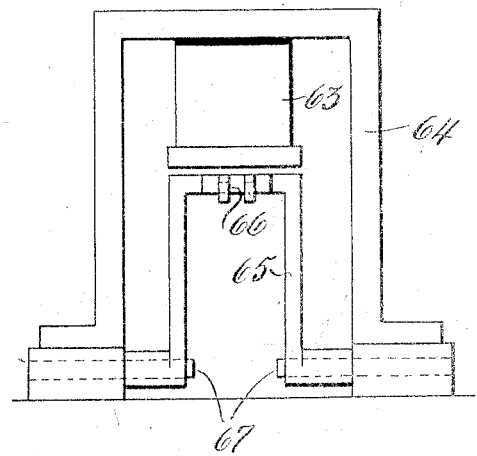
Figure 7:
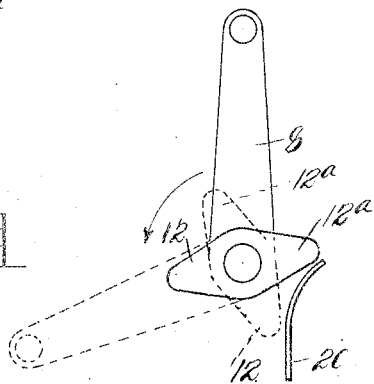
Figure 5:
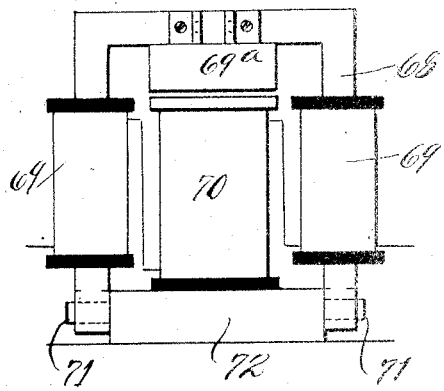
Figure 6:
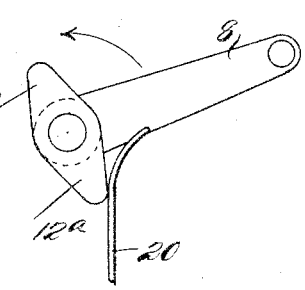

I will now proceed to describe my invention in detail, and will finally claim the novel features thereof, reference being had to the accompanying drawings, forming part hereof, wherein:

Figure 1 is a top plan view of my improved motor; Fig. 2 is a side elevation thereof, partly in section, the section being taken on a line a—a in Fig. 1; Fig. 3 is a detail end view of the magnet and co-operating armature; Figs. 4 and 5 are end views of other combinations of magnets, and armatures therefor; and Figs. 6 and 7 are diagrammatic views illustrating the operation of my improved circuit making and breaking device.

Before referring to the drawings, I will here state that the oscillating armature, which I employ, does not contact with the core of the adjacent or operating magnet, but swings adjacent thereto, the circuit controlling elements being positioned relative to the movement of the armature, so as to break the circuit when the armature has reached a position above the core of the magnet and centrally thereof, or, in other words, when the armature reaches the center of the magnetic field produced by the adjacent magnet. Due to the fact that the armature does not contact with the core of its operating magnet there is no friction at this point.

In the accompanying drawings, the magnet above referred to is designated by 1 and the oscillating or swinging armature by 2. By referring to Fig. 3, it will be seen that the armature 2 is angular in formation and that it is secured to a similar angular member 3, the said two connected members forming an oscillating yoke A. The armature 2 is preferably made from soft iron and the member 3 from brass or other similar material. The yoke, which I designate by A, is pivotally secured as at 4, to a block 5, which also carries the magnet 1. The yoke A is provided with a jaw-member 6 adapted to receive one end of a connecting rod or link 7, the other end of the said link being connected with the crank 8 of a main shaft 8ª. The shaft 8ª is provided with a balance or fly-wheel 9, the said main shaft being carried at each end thereof, by standards 10 and 11.

To control the energizing of the magnet 1, I provide contacts 12, 12ª and 13 and 13ª, which are keyed to, but adapted to slide longitudinally of, the shaft 8ª, the contacts 12, 12ª being for the forward movement and the contacts 13, 13ª for the reverse movement of the motor. To move the contacts 12, 12ª and 13, 13ª along the shaft 8ª, I employ a shifting device which consists of a lever 14 pivoted as at 15 to a bracket 16. The lever 14 carries a pin 17 which takes into an annular groove 18 in the hub 19 upon which the above-named contacts are mounted. To co-operate with the above-named contacts, I employ a brush contact 20 which is mounted upon a block 21 of insulating material, the said block being carried by a lever or arm 22, pivoted as at 23, to the base 24 of the motor. The object of mounting the brush contact 20 upon the pivotally supported arm 22 is to adapt the brush to be carried toward or away from the shaft 8ª, whereby the said brush may be adjusted relative to the contacts on said shaft, whereby the period of excitement of the magnet 1 may be shortened or lengthened as desired. By referring to Fig. 1, it will be seen that the brush contact 20 is in circuit with the binding post 25, and that the magnet 1 is connected to the other binding post 26, and grounded in the base 24, the wires 27 and 28 being connected to a source of electrical energy not shown.

In Fig. 1, the armature or yoke A is illustrated as commencing a forward stroke, or rather in a position at which the magnet 1 is energized to pull the armature forward. When the yoke A is in the position indicated, the contact $12^a$ will impinge upon the brush 20, thereby closing the circuit for the magnet 1. As the yoke A moves forward the crank 8 will be pushed forward toward a vertical position, the contact $12^a$ remaining in contact with the brush 20. When the yoke A has been pulled to a vertical position, and the crank 8 also moved to a vertical position, the contact $12^a$ will leave the contact 20, thereby breaking the circuit for the magnet 1 (see Fig. 7). As the current is now cut off from the magnet 1, the yoke A, and crank 8 will be moved toward the left dead center, of the crank 8, by the momentum of the fly wheel 9. The momentum of the fly wheel will carry the crank 8 over its left dead center and start the yoke A on its return stroke. After the crank 8 has slightly passed its left dead center, the contact 12 will impinge upon the brush 20 thereby energizing the magnet 1, and remain in contact therewith until the crank 8 reaches its lower vertical position, at which time the contact 12 will leave the brush 20 and break the circuit. The momentum of the fly wheel 9 will carry the crank to and over its right dead center, at which time the contact $12^a$ will impinge upon the brush 20, and the operation will be repeated.

It will be apparent from the above description that the magnetic field, or pull of the magnet 1, operates to swing the yoke A up to a vertical position, at which time the magnetic field is cut out, but the yoke A continues to swing over, due to the momentum of the parts.

One of the chief features of my improved motor is that the armature is acted upon by the magnetic field, twice in every revolution of the main shaft.

As the pivotal points 4 for the yoke A are remote from the line of greatest pull of the magnet the friction thereat is reduced to a minimum.

By reason of the angular formation of the armature member 2 of the yoke A there is a certain amount of influence exerted upon the side member 29 of the said armature by the magnetic field; that is to say, the side member 29 of the armature member 2 is placed close enough to the magnet 1 to bring the upper portion thereof in the field with the horizontal member 30. For this reason the greater part of the armature member 2 is acted upon by the magnetic field, which renders the motor more powerful than if only the horizontal member 30 is acted upon.

By referring to Figs. 6 and 7 it will be seen that the contacts 12, $12^a$ are disposed, relative to the crank 8, at such an angle as to cause the said contacts to impinge upon the brush 20 when the crank has passed over the dead centers and to leave the brush 20 when the said crank reaches a vertical position, at which time the armature will be centrally disposed, relative to the magnetic field. It is part of my invention to cut out the magnetic field, when the armature reaches the center thereof in order that there will be no opposition to the continued movement of the armature by the momentum of the fly wheel. To reverse the motor the current is cut off by pulling up the lever 22, thereby carrying the brush 20 away from the contacts, or by a switch placed externally of the motor, and then moving the hub 19 along the shaft $8^a$, by means of the lever 14, until the contacts 13, $13^a$ come in line with the brush 20. After the contacts 13, $13^a$ have been brought in line with the brush 20, the said brush can be caused to return to its normal position, in the event of the brush having been moved to cut the current off. Should the brush not touch either the contact 13 or $13^a$ the wheel 9 may be moved to start the motor. For a reverse movement the contacts 13, $13^a$ will control the circuit, as did the contacts 12, $12^a$ for the forward movement.

From the foregoing description, it will be apparent that the armature of my improved motor is pulled by the adjacent magnet, from approximately the limit of its swing to a vertical position and is then carried to the opposite limit of its swing by momentum, from which point it is pulled backward to a vertical position and is then carried onwardly by momentum to the point from which it was started.

Fig. 4 illustrates a bracket 64, having attached thereto the magnet 63. Beneath the magnet 63 I mount an oscillatory yoke, 65, provided with a jaw 66, which is adapted to receive one end of a connecting link. The yoke 65 is pivotally mounted on the pin 67.

Fig. 5 illustrates a yoke 68 which carries two magnets 69 and an armature $69^a$. Adjacent the armature $69^a$ I place a magnet 70. The lower end of the vertical members of the yoke 68 are pivotally mounted on pins 71 carried by the block 72. The action of the magnets 69 is to magnetize the yoke 68 and armature $69^a$ with one polarity, while the action of the magnet 70 is to present a magnetic field of opposite polarity, whereby the pull on the armature $69^a$ is increased.

In Fig. 4 the oscillatory yoke 65 is shown as mounted beneath the magnet 63 and operates in the same manner as the yoke A hereinbefore described.

In the form as illustrated in Fig. 5 the yoke 68 and armature 69ª carried thereby are magnetized by the magnets 69. The yoke 68 is adapted to swing across the upper face of the magnet 70 in the manner described for the yoke A in Fig. 2.

Having now described my invention, what I claim and desire to secure by Letters Patent is:—

1. An electric motor consisting of an electromagnet having a core, an armature pivoted adjacent said magnet adapted for movement across the face of said core, said armature being out of contact with said core, a shaft provided with a crank, a link connecting said crank and said armature, a plurality of sets of contacts slidably mounted upon said shaft and adapted to rotate therewith, a shift-lever adapted to move said contacts, and a brush contact adapted to impinge upon said slidable contacts, said brush contact being positioned to impinge upon one of said sets of slidable contacts when said motor is running forward, the other of said sets of slidable contacts being adapted to impinge upon said brush contact when said motor has been reversed, the sets of slidable contacts last named being brought into alinement with said brush contact by the movement of said shift-lever, said brush contact being in circuit with said magnet.

2. An electric motor consisting of an electromagnet having a core, an armature pivoted adjacent said magnet, adapted for movement across the face of said core, said armature being out of contact with said core, a shaft provided with a crank, a link connecting said crank and said armature, a plurality of sets of contacts, slidably mounted upon said shaft and adapted to rotate therewith, a shift lever adapted to move said contacts, a pivotally supported lever, and a brush contact, adapted to impinge upon said slidable contacts, carried by said pivotally supported lever, said brush contact being adapted to impinge upon one of said sets of slidable contacts when said motor is running forward, the other of said sets of slidable contacts being adapted to impinge upon said brush contact when said motor has been reversed, the sets of slidable contacts last named being brought into alinement with said brush contact by the movement of said shift lever, said brush contact being in circuit with said magnet.

Signed at New York city, N. Y., this 4th day of April, 1910.

CHARLES BACKER.

Witnesses:
EDWARD A. JARVIS,
DAVID HERSHFIELD.